(12) United States Patent
Henselmeyer

(10) Patent No.: US 11,451,053 B2
(45) Date of Patent: Sep. 20, 2022

(54) METHOD AND ARRANGEMENT FOR ESTIMATING A GRID STATE OF A POWER DISTRIBUTION GRID

(71) Applicant: SIEMENS AKTIENGESELLSCHAFT, Munich (DE)

(72) Inventor: Sylwia Henselmeyer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 46 days.

(21) Appl. No.: 16/901,342

(22) Filed: Jun. 15, 2020

(65) Prior Publication Data
US 2020/0395755 A1 Dec. 17, 2020

(30) Foreign Application Priority Data

Jun. 13, 2019 (EP) .................................. 19179955

(51) Int. Cl.
*H02J 3/00* (2006.01)
*G06K 9/62* (2022.01)
*G06Q 50/06* (2012.01)

(52) U.S. Cl.
CPC ............ *H02J 3/003* (2020.01); *G06K 9/6278* (2013.01); *G06Q 50/06* (2013.01); *H02J 3/002* (2020.01); *H02J 2203/20* (2020.01)

(58) Field of Classification Search
CPC .... H02J 3/00; H02J 3/002; H02J 3/003; H02J 2203/20; H02J 13/00006; G06K 9/6278; G06Q 50/06; Y02E 60/00; Y04S 40/12; Y04S 40/20; Y02B 90/20
See application file for complete search history.

(56) References Cited

U.S. PATENT DOCUMENTS

| | | | | |
|---|---|---|---|---|
| 10,673,380 B2* | 6/2020 | Wenzel | .................. | H02S 40/38 |
| 10,797,511 B2* | 10/2020 | Wenzel | ..................... | H02J 7/35 |
| 10,942,209 B2* | 3/2021 | Piyasinghe | .......... | G01R 31/088 |
| 2013/0262001 A1* | 10/2013 | Sun | ................... | H02J 13/00028 |
| | | | | 702/60 |
| 2015/0168465 A1* | 6/2015 | Gadiraju | .......... | H02J 13/00002 |
| | | | | 702/60 |

(Continued)

FOREIGN PATENT DOCUMENTS

| CN | 107846016 A | | 3/2018 | |
|---|---|---|---|---|
| CN | 109800995 A | * | 5/2019 | ............. G06Q 10/06 |

(Continued)

OTHER PUBLICATIONS

Machine translation of CN-109800995-A (May 2019), as translated Sep. 24, 2021.*

(Continued)

*Primary Examiner* — M. N. Von Buhr
(74) *Attorney, Agent, or Firm* — Laurence A. Greenberg; Werner H. Stemer; Ralph E. Locher

(57) ABSTRACT

A method estimates a grid state of an electrical power distribution grid having a multiplicity of network sections, in which a central computer arrangement is used to receive measured values from measuring devices. A state estimation device is used to make a prediction of a future grid state, wherein a voltage and a phase angle are respectively ascertained for each network section, and in that a naive Bayes method is used for the prediction.

14 Claims, 2 Drawing Sheets

(56) References Cited

U.S. PATENT DOCUMENTS

| | | | | |
|---|---|---|---|---|
| 2017/0244250 | A1* | 8/2017 | Sun | H02J 3/18 |
| 2017/0292824 | A1* | 10/2017 | Yamazaki | H02J 3/46 |
| 2017/0353031 | A1* | 12/2017 | Sun | H02J 3/18 |
| 2018/0054058 | A1* | 2/2018 | Kumagai | G06Q 50/06 |
| 2018/0262010 | A1* | 9/2018 | Kato | H02J 3/46 |
| 2019/0260204 | A1* | 8/2019 | Koval | G06N 3/126 |
| 2019/0260205 | A1* | 8/2019 | Kato | H02J 3/24 |
| 2019/0288514 | A1* | 9/2019 | Shukla | G05B 15/02 |
| 2019/0293699 | A1* | 9/2019 | Zhang | H02J 3/00 |
| 2020/0082248 | A1* | 3/2020 | Villegas | G06N 3/0454 |
| 2020/0134394 | A1* | 4/2020 | Teshome | G06N 7/005 |
| 2020/0164763 | A1* | 5/2020 | Holme | B60L 58/10 |
| 2020/0212710 | A1* | 7/2020 | Gu | H02J 3/06 |
| 2020/0251902 | A1* | 8/2020 | Tsujii | H02J 3/24 |
| 2021/0197859 | A1* | 7/2021 | Canady | G07C 5/008 |

FOREIGN PATENT DOCUMENTS

| | | |
|---|---|---|
| EP | 3467984 A1 | 4/2019 |
| WO | 2018191436 A1 | 10/2018 |

OTHER PUBLICATIONS

JD Taft, "Fault Intelligence: Distribution Grid Fault Detection and Classification," U.S. Dept. of Energy, Pacific Northwest National Laboratory, Sep. 2017, 38 pages.*

Rohan Nanda: "A Bayesian Approach for Forecasting Heat Load in a District Heating System", Master's Thesis in Pervasive Computing & COMmunications for sustainable development, Lulea University of Technology, 2015.

Rui Yang et al.: "Short-Term State Forecasting—Based Optimal Voltage Regulation in Distribution Systems", NREL—National Renewable Energy Laboratory, IEEE Eight Conference on Innovative Smart Grid Technologies (IEEE ISGT 2017) Arlington, Virginia, Apr. 23-26, 2017.

Siemens Ingenuity for Life: "Digital substations with the Future built in", Energy Management Division, Siemens AG 2017, Article No. EMDG-B10130-00-7600, siemens.com/digital-substation.

Siemens Ingenuity for Life: "Intelligent control center technology—Spectrum Power—The Smart Grid—Constant Energy in a World of Constant Change" Energy Management Division, Siemens AG 2017, Article No. EMDG-B90019-00-7600, siemens.com/spectrum-power.

I. Dzafic et al.:, "Real-Time Distribution System State Estimation" 978-1-4244-7398-1 IEEE, IPEC 2010, pp. 22-27.

Siemens Ingenuity for Life: "Spectrum Power—Aktives Netzmanagement" [Manage energy optimally with Spectrum Power ANM], Energy Management Division, Siemens AG 2016, Article No. EMDG-B10104-00, siemens.de/anm-English Version.

Siemens Ingenuity for Life: "Siguard Dsa—Dynamic security assessment", Siemens AG 2017, siemens.com/siguard.

I. Dzafic et al.: "Real Time Distribution System State Estimation Based on Interior Point Method", 17th Power Systems Computation Conference, Stockholm Sweden, Aug. 22-26, 2011.

Y.T. Quek et al.: "A Naive Bayes Classification Approach for Short-Term Forecast of a Photovoltaic System" Conference paper Mar. 2017 DOI: 10.5176/2251-198X_SEE17.5.

Izudin Dzafic et al.: "Real Time Estimation of Loads in Radial and Unsymmetrical Three-Phase Distribution Networks", IEEE Transactions on Power Systems, vol. 28, No. 4, Nov. 2013, pp. 4839-4848.

Huaiguang Jiang et al: "Short-term Distribution System State Forecast Based on Optimal Synchrophasor Sensor Placement and Extreme Learning Machine" IEEE Power and Energy Society General Meeting, Jul. 2016, pp. 1-5.

* cited by examiner

METHOD AND ARRANGEMENT FOR ESTIMATING A GRID STATE OF A POWER DISTRIBUTION GRID

CROSS-REFERENCE TO RELATED APPLICATION

This application claims the priority, under 35 U.S.C. § 119, of European patent application EP 19179955, filed Jun. 13, 2019; the prior application is herewith incorporated by reference in its entirety.

BACKGROUND OF THE INVENTION

Field of the Invention

The invention relates to a method for estimating a grid state of a power distribution grid, to a central computer arrangement and to a computer program product according to claim.

The product brochure, entitled "Intelligent Control Center Technology—Spectrum Power", Siemens AG 2017, article No EMDG-B90019-00-7600, discloses software for what is known as a "supervisory control and data acquisition (SCADA)" system, that is to say a control center. SCADA systems have long been recognized for supervising and controlling power grids (see Wikipedia permanent link: https://en.wikipedia.org/w/index.php?title=SCADA&oldid=858433181). Measured values from sensors, for example from voltmeters and ammeters in the power grid, are aggregated and conveyed to the control center. Circuit breakers and isolators in the power grid are controlled, and power generators such as power stations are actuated, by sending control commands to the power grid. These control commands are received by remote terminal units (RTUs), programmable logic controllers (PLCs) and intelligent devices (IEDs) and processed to actuate the circuit breakers and the isolators, etc. In the control center, there has to date often been provision for a local computer center on which the control center software such as e.g. Spectrum Power runs. Engineers are kept ready in the control center round the clock, who supervise the displays of the SCADA about the present operating state of the power grid and can take countermeasures such as e.g. disconnecting a grid section in the event of error. The control center software is usually operated in a central computer arrangement, which can be in the form of a computer center having processors, data memories and screens, for example. The term "central" means that all measurement data from the power grid and all control commands for the power grid are processed centrally.

It is also possible for some or all of the computer arrangement or the control center software to be in the form of a cloud application, that is to say a server arrangement having locally distributed resources for data processing and data storage that are connected via a data network such as e.g. the Internet.

A phenomenon that accompanies an ever wider spread of distributed power generation, that is to say for example by photovoltaic installations or wind turbines, is that prediction of a system state of the power grid is hampered by the increasingly numerous local power generators that feed into the low- and medium-voltage grid. Dependency on weather influences also increases because e.g. solar cells are greatly influenced by cloud cover and wind turbines by wind strength. These problems also retroactively affect the next highest voltage level of a high voltage level power transmission grid, which is therefore more difficult to control and predict.

To date, load and generation forecasts and/or timetables have generally been used in conjunction with what is known as a "distribution system power flow (DSPF)" to assess a future grid state. DSPF uses static equipment data, local prediction of a power consumption and power generation and also dynamic topology information (i.e. which lines are currently connected between the individual components) in order to calculate a forecast voltage magnitude and voltage angle on each network section. Such an approach is known for example from the product brochure entitled "Spectrum Power Active Network Management", Siemens AG 2016, EMFG-B10104-00. The technical principles are known from the publications "Real-Time Distribution System State Estimation" by Dzafic et al., 2010 IEEE 978-1-4244-7398-4 and "Real-Time Estimation of Loads in Radial and Unsymmetrical Three-Phase Distribution Networks" by Dzafic et al., 2013 IEE 0885-8950.

Furthermore, monitoring and supervision of power distribution networks, in particular at the low voltage level, is accomplished by using what are known as "digital substations", that is to say substations having their own computer capacity for data capture and evaluation. The incorporation of such a substation into a SCADA system is known for example from the publication "Digital Substations with the Future Built In", Siemens AG 2017, article No EMDG-B10130-00-7600, from page 5.

SUMMARY OF THE INVENTION

Against the background of known methods for estimating a grid state of a power distribution grid, the invention is faced with the object of specifying a method that can be used to estimate a future system state of the power distribution grid comparatively simply and quickly.

The invention achieves this object by means of a method according to the independent method claim.

A grid state within the context of the invention contains for example a statement about the voltage magnitude or a voltage and the voltage angle or phase angle on each network section. A network section is e.g. also referred to as a "network bus" within the context of the "bus branch" model. It acts as a grid model connecting point at which modeled equipment of the electrical grid such as lines, transformers, loads and generators of electric power can be linked.

A central computer arrangement has processors, data memories and screens, for example. The term "central" means that all essential measurement data from the power grid and all essential control commands for the power grid are processed centrally.

Measuring devices can be for example voltmeters, ammeters, phasor measurement units (PMUs), remote terminal units or smart meters, intelligent electrical devices (IEDs) for monitoring switches and other equipment, control devices e.g. for smart substations or protection equipment. The data transmission of the measurement data can take place e.g. on the basis of the IEC 61850 protocol or on the basis of the Internet Protocol. Data can be transmitted by powerline communication via the electricity grid or by radio e.g. by LTE (4G) or by cable such as e.g. Ethernet or optical fiber.

The state estimation device has at least one processor in order to allow complex calculations for performing the naive Bayes method. A computer center or a physically distributed server and database architecture such as a cloud can also be used.

Naive Bayes methods have been used as machine learning methods for example in the field of text analysis. "A Naive Bayes Classification Approach for Short-Term Forecast of a Photovoltaic System" by Quek et al. 2017, DOI 10.5176/2251-189X_SEES17.5, admittedly discloses the practice of using local measured values such as e.g. time of day, outside temperature, light intensity, temperature of a module having solar cells, to make a prediction of a future power of the PV installation. However, no approach is known in the prior art to date to performing a naive Bayes method for optimized prediction of a system state in the electrical power distribution grid, in particular in the low voltage level distribution grid.

In contrast to previous approaches for predicting grid state, in particular in distribution grids, the naive Bayes approach can be used to make comparatively accurate predictions, even though there are often too few measurement locations for complete monitoring of the grid and, for reasons of complexity, not every installation directly modulated in the grid can be captured with a prediction of its own. This saves time and costs and, with the comparatively accurate prediction, allows grid stability problems to be detected early and hence the availability of the power grid to be improved.

The previous approach to state estimation by means of the DSPF described at the outset regularly results in the disadvantage that local predictions are not available for all connection points on every network section, because suitable measuring devices are not installed everywhere. Furthermore, aggregation of local predictions of this kind with corresponding large error inaccuracies results in it being necessary to assume a comparatively large error in an aggregated grid state estimate too.

A fundamental advantage of the method according to the invention is that what is known as a "distribution system state estimator (DSSE)" is used instead of the DSPF. The DSSE is designed to take into consideration at least some of the available system information such as e.g. static equipment data, local predictions of a power consumption and power generation, dynamic topology information (i.e. which lines are currently connected between the individual components), dynamic analog power measurements, voltage and current values and differences in the accuracy of different measuring instruments. A DSSE method can be used to estimate the most likely future grid state from this information. The result of the estimate can be understood to be an indication of voltage and phase angle on every network section.

In a preferred embodiment of the method according to the invention, a low-voltage grid is used for at least part of the power distribution grid. This is an advantage because the prediction of the grid state is particularly problematic at this voltage level on account of the multiplicity of loads and generators.

In a further preferred embodiment of the method according to the invention, specific predictions for individual measuring devices that each have a measurement-location-specific degree of error are taken into consideration for the prediction, wherein the respective degree of error is used to determine a measurement-location-specific weighting factor such that specific predictions are weighted all the more highly the lower their degree of error. This is an advantage because empirical values can be taken as a basis for taking into greater consideration measurement locations that are rateable as particularly accurate, which has a positive influence on prediction quality.

In a further preferred embodiment of the method according to the invention, at least some of the measuring devices are arranged in substations. Within the context of the invention, a substation is a local grid transformer station. This embodiment has the advantage that the measurements of a substation already indicate a sum of the influences of numerous loads and generators of electric power, which means that all in all a less erroneous method can be expected than when every single connection point for a generator or load on a network section is taken into consideration.

In a further preferred embodiment of the method according to the invention, historical measurement data and/or weather data are additionally used. This is an advantage because there is frequently already a data collection available for individual measurement locations that goes way back.

In a further preferred embodiment of the method according to the invention, at least some measuring devices are arranged at feed points of the network sections.

In a further preferred embodiment of the method according to the invention, the prediction estimates the grid state at least 5 hours in advance. This is an advantage because 5 hours in advance are sufficient to initiate countermeasures in the event of problems in the power grid that are identified on the basis of the predictions. In a development of the aforementioned embodiment, the prediction can take place up to 24 hours in advance with sufficient accuracy.

In a further preferred embodiment of the method according to the invention, the prediction has on average a divergence of no more than 10% from the grid state actually found later. The divergence of on average no more than 10% is intended to be understood to be what is known as a "mean average percentage error (MAPE)" of 10%, for example.

In a further preferred embodiment of the method according to the invention, the prediction of a future grid state is taken as a basis for using an error correction device to select a countermeasure in order to avoid limit value infringements. By way of example, a prescribed voltage band of +/−10% around the envisaged rated voltage can be provided with an upper and a lower limit value. If the predicted voltage is above or below these limit values or there is even the threat of a power failure, then a countermeasure accordingly needs to be taken at present. A countermeasure within the context of the invention is for example a reduction in the consumption of an individual load or of a load group or a reduction in the feed power from a power generator or a group of power generators or a change in a timetable for a load or generator of electric power. By way of example, appropriate control commands for specified values can be sent to responsive equipment in the power grid.

Furthermore, against the background of known methods for estimating a grid state of a power distribution grid, the invention is faced with the object of specifying a central computer arrangement that can be used to estimate a future system state of the power distribution grid comparatively simply and quickly.

The invention achieves this object by means of a central computer arrangement according to independent computer claim. Preferred embodiments are obtained from the subclaims. The same advantages as illustrated at the outset for the method according to the invention arise mutatis mutandis in this case.

In addition, against the background of known methods for estimating a grid state of a power distribution grid, the invention is faced with the object of specifying a computer program product that can be used to estimate a future system state of the power distribution grid comparatively simply and quickly.

The invention achieves this object by means of a computer program product according to the independent computer product claim. The same advantages as illustrated at the outset for the method according to the invention arise mutatis mutandis in this case.

Other features which are considered as characteristic for the invention are set forth in the appended claims.

Although the invention is illustrated and described herein as embodied in a method and an arrangement for estimating a grid state of a power distribution grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
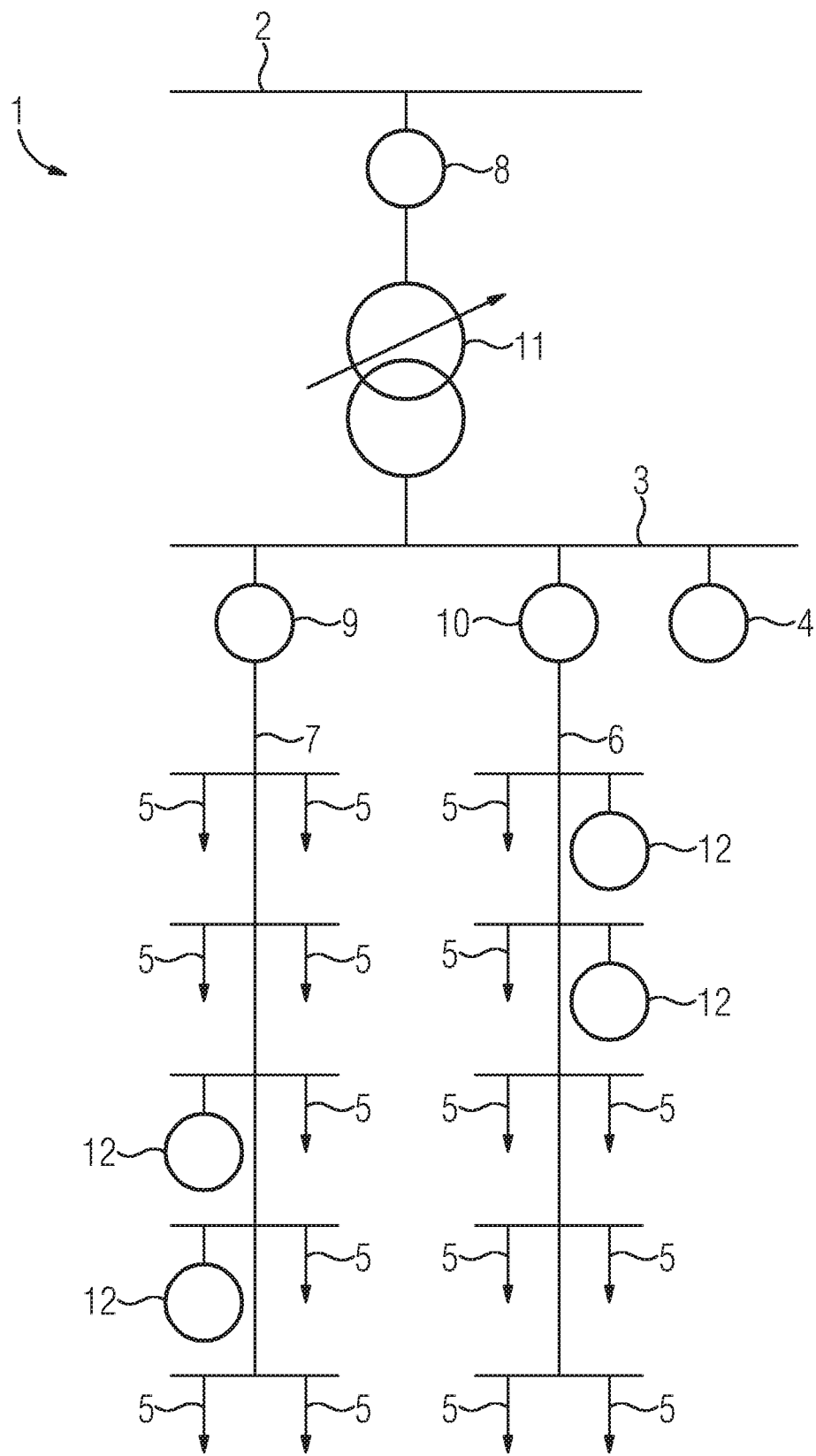
FIG. 1 is an illustration showing an example of a power distribution grid.

Referring now to the figures of the drawings in detail and first, particularly to FIG. 1 thereof, there is shown a simple example of a power distribution grid 1. The power distribution grid 1 has a medium-voltage level 2 connected via a substation to a measurement location 8 and via a transformer 11 to a low-voltage level 3 of the distribution grid. The distribution grid 3 has two sections 6, 7 or branches. Each branch has multiple generators 12 of electric power, which are each depicted as a circuit. These can be wind turbines or photovoltaic installations, for example. Electrical loads 5 are depicted as arrows, the electrical loads 5 being able to be single-family homes or the like, for example. In section 7, there is provision for a measurement location 9 in the connecting line to the distribution grid 3. In the section 6, there is provision for a measurement location 10 in the connecting line to the distribution grid 3.

The increasing feed from generators of renewable energy at distribution grid level means that it is becoming increasingly important to be able to make reliable predictions of the grid state. Only on the basis of a resilient prediction is it possible for an operator of a control center to detect problems and initiate countermeasures in good time. To date, this has been accomplished for the most part by making predictions for individual pieces of equipment such as e.g. the generators 12 and loads 5 cited at the outset. This information is used to calculate power flows in the power grid. This approach has several disadvantages:

a) the individual predictions for the equipment 5, 12 frequently contain comparatively large errors, because individual pieces of equipment 5, 12 are by their nature subject to greater fluctuations than aggregated considerations—that is to say e.g. the measurement data obtained at the measurement locations 8, 9, 10.

b) Every feed needs to be predicted.

c) All predictions are used regardless of the prediction quality, in order to make a summarized prediction.

d) Weather forecasts are usually available for larger areas and not selectively for regions in which individual installations are installed.

By contrast, the invention proposes making predictions for the measurement locations 8, 9, 10, at which there is already a high level of aggregation of the individual influences of the loads 5 and generators 12. his has the particular advantage that there are comparatively small errors for the prediction. Since not all feeds from the generators 12 into the grid are known, a power flow calculation can no longer be performed with sufficient accuracy. Instead, the invention requires a state estimation to be performed that relates to the whole power distribution grid 1.

The accuracy of the predictions can be increased further if specific predictions for individual measuring devices that each have a measurement-location-specific degree of error are taken into consideration for the prediction, wherein the respective degree of error is used to determine a measurement-location-specific weighting factor such that specific predictions are weighted all the more highly the lower their degree of error. More reliable estimates are therefore weighted more highly for the final prediction.

The invention proposes using what is known as a naive Bayes approach. The input data required for this are for example:

a) historical measurement data pertaining to the real power, which preferably have a comparable time resolution to the prediction to be provided as the end result; e.g. 15 minutes or one hour. In this context, "historical" denotes longer measurement periods for capturing the measurement data provided with timestamps, e.g. over days, weeks or months, an identification of the type of day (weekday, workday, weekend, public holiday, etc.) also being advantageous, in particular. Furthermore, the historical data pertaining to the real power relate to grids without correction measures such as e.g. downward regulation. Should the historical data pertaining to the real power already relate to "corrected" grids, it must be known what has been corrected in order to perform appropriate conversion (backward correction) of the historical data.

b) historical and predicted weather data: ambient temperature, wet-bulb temperature (the lowest temperature that can be reached as a result of direct evaporative cooling), dew point, relative humidity, wind speed, light intensity.

c) where available, historical and predicted market data such as e.g. the price of electricity etc. can also be used.

In the naive Bayes approach, a classification is performed such that the probability of the predicted value ("forecast") is provided by the measurement data ("predictor", e.g. ambient temperature, wet-bulb temperature, etc.):

$$P(\text{Forecasted}_F | \text{Predictor}) = (P(\text{Predictor} | \text{Forecasted}_F) * P(\text{Forecasted}_F)) / P(\text{Predictor})$$

The designations here are as follows:

Forecasted$_F$ variable to be predicted: real power at the respective measurement location.

Predictor prediction variable correlated with the value to be predicted, real power. It can be e.g. ambient temperature and/or wet-bulb temperature.

P(Predictor|Forecasted$_F$) dependent probability of prediction variable assuming the value v if variable to be predicted has the value w.

P(Forecasted$_F$) probability of the variable to be predicted, real power, assuming the value f.

P(Predictor) probability of the prediction variable assuming the value v.

Figure 2:
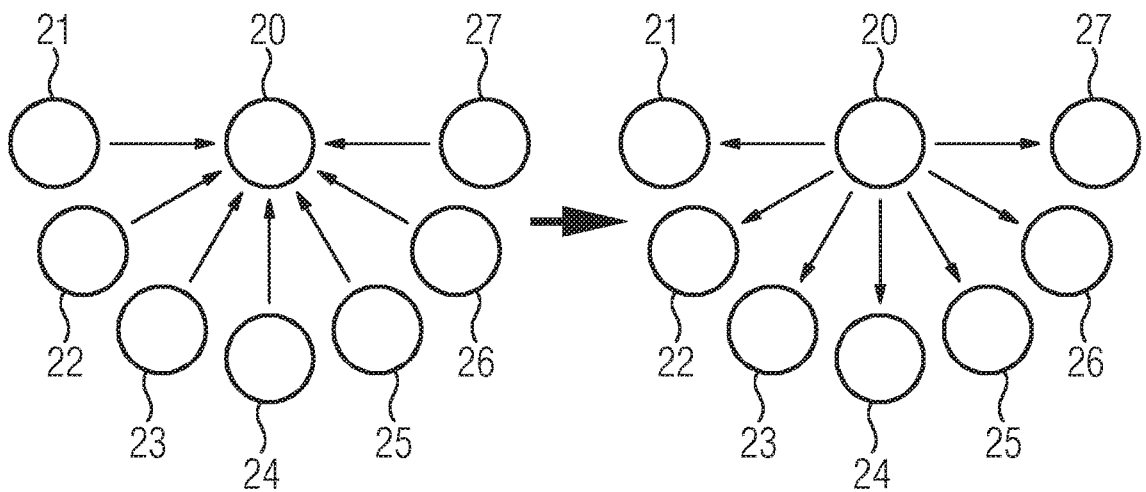
FIG. 2 is an illustration showing an approach for a naive Bayes method.

Furthermore, the naive Bayes classification allows the prediction model to be substantially simplified. In this regard, FIG. 2 shows that the real power on a load 20—on the left in FIG. 2—is calculated in previous approaches from a multiplicity of individually calculated prediction variables for e.g. previous real power on the load, hour of the day, evaporative cooling, dew point, temperature, relative humidity or type of day (weekday, weekend, public holiday, etc.). This is indicated by the arrows pointing from the individual prediction variables to the variable to be predicted, real power 20. This is very computation intensive, however.

By contrast, a reversal of the arrow direction—in the right-hand part of FIG. 2—is obtained, since the prediction variables are trained for the real power in the naive Bayes approach. This "turnaround of the arrows" causes separation of the conditional probability for each prediction variable.

To use the naive Bayes approach, there can be provision for the following steps:
a) iterative calculation of a vector for the envisaged classes,
b) in each class, calculation of:

$P(Class_i | Predictors) =$     i)

$$\prod_{j=1}^{M} \frac{(P(Predictor_j | Class_i) * P(Class_i))}{P(Predictor\_j)}$$     ii)

identification of that class for which the highest value is achieved from the preceding step:

Arg max $k \in \{1,k\}(P(Class_i|Predictors)$

In order now to predict the real power, two steps are performed in succession:
a) training
b) work step.

During the training (A), the following substeps can be performed:
A1) collecting historical data
A2) conditioning the historical data in order e.g. to remove outliers and obvious errors. It is also possible for missing data points to be added by means of estimations in order to obtain a complete time series.
A3) if necessary converting the historical data into discrete values, e.g. by means of an "equal bin approach".
A4) providing a training data record and an evaluation data record, each having the conditioned historical data.
A5) calculating conditional probability tables for each pair comprising variable to be predicted (e.g. real power at the respective measurement location) and prediction variable, based on the training data record. Preferably, the tables are determined for each type of day (workday, weekend, public holiday, etc.) and in accordance with the time resolution for each time of day, that is to say e.g. for desired prediction of one hour in the future with hourly resolution.
A6) performing naive Bayes with the training data record or the probability tables.
A7) checking the prediction accuracy from A7 using the evaluation data record.

A8) ascertaining the respective prediction error for each prediction at a measurement location. A measurement-location-specific degree of error is calculated as "mean average percentage error (MAPE)".

In the work step (B), e.g. the following substeps can be performed:
B1) if necessary converting the measurement data from each measurement location into discrete values, e.g. by means of an "equal bin approach". Preferably, measurement data from the same point in time are used, the available time resolution and the desired prediction accuracy being able to be used to stipulate the size of the time window of measurement data that is supposed to be used.
B2) providing a measurement data record containing the measurement data from step (B1).
B3) performing naive Bayes with the measurement data record and with the probability tables.
B4) ascertaining and storing the most probable grid state from step (B3) for the respective point in time.

When used e.g. in a state estimation device such as for example the DSSE described at the outset, the following steps can be added:
B5) stipulating a point in time in the future at which the prediction is supposed to indicate the grid state.
B6) consulting prediction data and optionally forecast timetables for generators and/or loads from a prediction database that each relate to the measurement locations. Additionally, prediction data pertaining to individual feed points into the grid can also be used.
B7) stipulating a prediction error for the prediction data from step (B6), a percentage of between 0% and 100% being stipulated. The following holds for the respective prediction error w:

$W=1$/prediction error with $w=100$ for prediction error=0.

B8) performing the state estimation for the point in time in the future.
B9) evaluating the prediction for the grid state at the future point in time such that it is stipulated whether permissible threshold values for electrical quantities are infringed. These can involve a prescribed voltage band and/or a maximum current, for example. They can also involve a phase angle. This check is performed for all network sections, lines and transformers.

Figure 3:
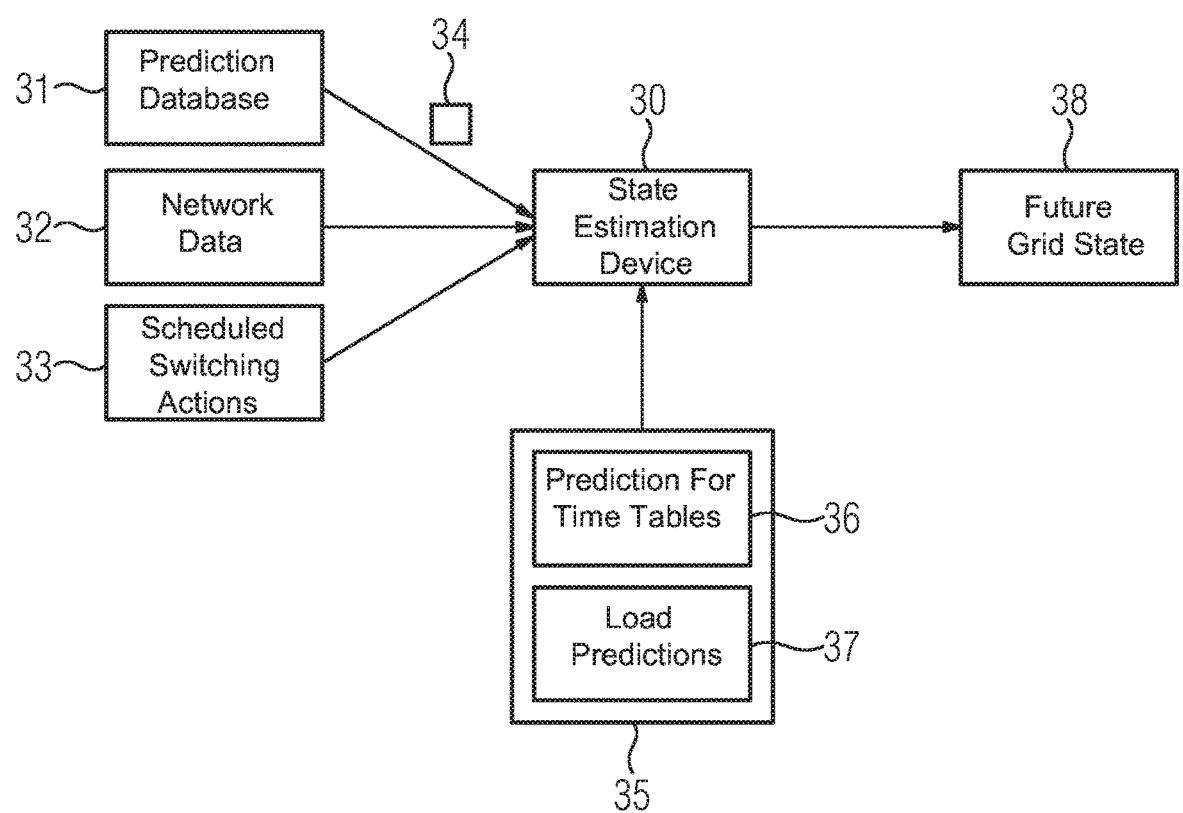
FIG. 3 is a block diagram showing an example of a method according to the invention.

FIG. 3 shows an example of a method according to the invention. Predictions 34, which, in particular, have weighting factors corresponding to the prediction errors from step B(7), are taken from a prediction database 31 for the measurement locations. Furthermore, network data 32 pertaining to the topology and electrical properties of the grid and of the equipment are retrieved. Scheduled switching actions 33 are also included too.

These input data are used in a state estimation device 30 to perform the estimation and provide a prediction of a future grid state 38.

Optionally, predictions for timetables 36 and load predictions 37 can also be taken into consideration.

The invention claimed is:

1. A method for estimating a grid state of an electrical power distribution grid having a plurality of network sections, where a grid state contains a statement about the voltage magnitude or a voltage and the voltage angle or phase angle on each network section, which comprises the steps of:

measuring, with measuring devices, a voltage and a phase angle for each of the plurality of network sections of the electrical power distribution grid and generating corresponding measured values;

receiving, via a central computer configuration, the measured values from the measuring devices;

using a state estimation device to make a prediction of a future grid state based on the measured values, wherein a voltage and a phase angle are respectively ascertained for each of the network sections; and using a machine learning method, being a naive Bayes method, for formulating the prediction;

taking into consideration, for the prediction, specific predictions for individual ones of the measuring devices that each have a measurement-location-specific degree of error; and determining a measurement-location-specific weighting factor, using a respective degree of error, such that the specific predictions are weighted all more highly a lower their degree of error; and presenting the predictions to a central controller, and initiating countermeasures to the grid based on the predictions when necessary.

2. The method according to claim 1, wherein a low-voltage grid is used for at least part of the electrical power distribution grid.

3. The method according to claim 1, which further comprising disposing at least some of the measuring devices in substations.

4. The method according to claim 1, which further comprises disposing at least some of the measuring devices at feed points of the network sections.

5. The method according to claim 1, wherein the prediction estimates a grid state at least 5 hours in advance.

6. The method according to claim 1, wherein the prediction has a mean average percentage error of no more than 10%.

7. A central computer configuration for estimating a grid state of an electrical power distribution grid having a plurality of network sections, where a grid state contains a statement about the voltage magnitude or a voltage and the voltage angle or phase angle on each network section, the central computer configuration comprising:

measuring devices configured to measure a voltage and a phase angle for each of the plurality of network sections of the electrical power distribution grid and generating corresponding measured values a receiving device for receiving the measured values from said measuring devices disposed in the electrical power distribution grid; and a state estimation device configured to make a prediction of a future grid state based on the measured values, wherein a voltage and a phase angle are respectively ascertained for each of the network sections, said state estimation device is configured to use a machine learning method, being a naive Bayes method, for formulating the prediction, and specific predictions for individual ones of the measuring devices that each have a measurement-location-specific degree of error are taken into consideration for the prediction, and a respective degree of error is used to determine a measurement-location-specific weighting factor such that the specific predictions are weighted all more highly a lower their degree of error; and a central controller configured for presenting the predictions, and initiating countermeasures to the grid based on the predictions when necessary.

8. The central computer configuration according to claim 7, wherein at least part of the electrical power distribution grid has a low-voltage grid.

9. The central computer configuration according to claim 7, wherein said state estimation device is configured to take into consideration for the prediction specific predictions for individual ones of the measuring devices that each have a measurement-location-specific degree of error, wherein a respective degree of error is used to determine a measurement-location-specific weighting factor such that the specific predictions are weighted all more highly a lower their degree of error.

10. The central computer configuration according to claim 7, wherein at least some of the measuring devices are disposed in substations.

11. The central computer configuration according to claim 7, wherein at least some of the measuring devices are disposed at feed points of the network sections.

12. The central computer configuration according to claim 7, wherein said state estimation device is configured to use the prediction to estimate the grid state at least 5 hours in advance.

13. The central computer configuration according to claim 7, wherein said state estimation device is configured with a mean average percentage error of no more than 10%.

14. A non-transitory computer readable medium having computer executable instructions for performing a method for estimating a grid state of an electrical power distribution grid having a plurality of network sections, where a grid state contains a statement about the voltage magnitude or a voltage and the voltage angle or phase angle on each network section, which comprises the steps of:

measuring, with measuring devices, a voltage and a phase angle for each of the plurality of network sections of the electrical power distribution grid and generating corresponding measured values;

receiving, via a central computer configuration, the measured values from the measuring devices;

using a state estimation device to make a prediction of a future grid state based on the measured values, wherein a voltage and a phase angle are respectively ascertained for each of the network sections; and using a machine learning method, being a naive Bayes method, for generating the prediction; and taking into consideration, for the prediction, specific predictions for individual ones of the measuring devices that each have a measurement-location-specific degree of error; and determining a measurement-location-specific weighting factor, using a respective degree of error, such that the specific predictions are weighted all more highly a lower their degree of error; and presenting the predictions via a central controller, and initiating countermeasures to the grid based on the predictions when necessary.

* * * * *